(12) United States Patent
Katada (10) Patent No.: US 8,833,429 B2
(45) Date of Patent: Sep. 16, 2014

(54) SUNSHADE DEVICE

(75) Inventor: Naochika Katada, Settsu (JP)

(73) Assignee: Ashimori Industry Co., Ltd., Osaka-shi (JP)

( * ) Notice: Subject to any disclaimer, the term of this patent is extended or adjusted under 35 U.S.C. 154(b) by 329 days.

(21) Appl. No.: 13/383,858

(22) PCT Filed: Aug. 20, 2010

(86) PCT No.: PCT/JP2010/064072
§ 371 (c)(1),
(2), (4) Date: Jan. 13, 2012

(87) PCT Pub. No.: WO2011/024717
PCT Pub. Date: Mar. 3, 2011

(65) Prior Publication Data
US 2012/0111512 A1    May 10, 2012

(30) Foreign Application Priority Data

Aug. 28, 2009    (JP) ................................. 2009-198107

(51) Int. Cl.
*B60J 1/18*    (2006.01)
(52) U.S. Cl.
USPC ........................ 160/370.22; 160/70
(58) Field of Classification Search
USPC ........................ 160/370.22, 70, 71
IPC ................ E04F 10/0603,10/0618; B60J 1/208, B60J 1/2055
See application file for complete search history.

(56) References Cited

U.S. PATENT DOCUMENTS 1,258,977 A * 3/1918 Baptiste ........................... 160/71
5,752,560 A * 5/1998 Cherng ..................... 160/370.22
(Continued)

FOREIGN PATENT DOCUMENTS

| CN | 201249653 Y | 6/2009 |
|---|---|---|
| EP | 0 989 006 | 3/2000 |
| EP | 2 000 340 | 12/2008 |
| JP | 11 62442 | 3/1999 |

OTHER PUBLICATIONS

International Search Report Issued Nov. 22, 2010 in PCT/JP10/64072 Filed Aug. 20, 2010.

(Continued)

*Primary Examiner* — David Purol
(74) *Attorney, Agent, or Firm* — Oblon, Spivak, McClelland, Maier & Neustadt, L.L.P.

(57) ABSTRACT

Included are a windup device, a screen mounted to the windup device so as to be drawn therefrom and housed therein, a stay mounted to a drawing-side edge of the screen, and a pair of arms each including a distal end portion connected to the stay so as to rotate relative thereto and a proximal end portion supported by the windup device so as to rotate relative thereto about a rotation axis, the pair of arms being configured to change a position between a folded position and an extended position through a rotary movement about the rotation axis. The pair of arms are configured such that in the extended position, one-end-side portion of a pivot base extends toward a vertical frame of a window from the rotation axis and the other-end-side portion of the pivot base and an arm part extend along the vertical frame in a manner of being bent from the distal end portion of the one-end-side portion of the pivot base, and that the arm part and the pivot base are connected so as to rotate relative thereto.

2 Claims, 7 Drawing Sheets

(56) References Cited

U.S. PATENT DOCUMENTS

| | | | |
|---|---|---|---|
| 6,216,762 B1* | 4/2001 | Lin | 160/370.22 |
| 6,763,874 B1* | 7/2004 | Chen | 160/370.22 |
| 7,455,345 B1* | 11/2008 | Kim | 296/97.4 |
| 2005/0253411 A1 | 11/2005 | Chai et al. | |
| 2009/0277595 A1* | 11/2009 | Gao et al. | 160/370.21 |

OTHER PUBLICATIONS

International Preliminary Report on Patentability and Written Opinion issued Feb. 28, 2012 in Patent Application No. PCT/JP2010/064072 with English Translation.

U.S. Appl. No. 13/822,418, filed Mar. 12, 2013, Katada.

U.S. Appl. No. 13/497,334, filed Mar. 21, 2012, Katada.

Notification of Reason(s) for Refusal issued May 7, 2013 in Japanese Patent Application No. 2009-198107 (with partial English translation).

U.S. Appl. No. 13/636,147, filed Sep. 20, 2012, Katada.

Combined Office Action and Search Report issued Oct. 10, 2013 in Chinese Patent Application No. 201080038273.5 (with partial English language translation).

* cited by examiner

SUNSHADE DEVICE

TECHNICAL FIELD

The present invention relates to the technology of extending a screen along a window of a vehicle to shade the window.

BACKGROUND ART

Patent Document 1 discloses the technology as a sunshade device. In the motor-driven sunshade device of Patent Document 1, a lower edge of a screen having a shape corresponding to a rear window of a vehicle is secured to a windup roller, and an upper edge thereof is secured to a horizontal frame, whereby the rear window is shaded by extending the screen upward or downward with vertical frame arms therebetween. The windup roller is constantly biased in the direction in which the screen is wound up by an incorporated coil spring. More specifically, as shown in FIG. 3 of Patent Document 1, the motor-driven sunshade device includes vertical arms each including a mounting part, a pivot part and an arm part. The vertical arm is configured so as to rotate upward and downward along a plane parallel to the window with a pivot shaft provided to a back surface of a proximal end of the mounting part in a projecting manner to be directly connected to a motor. Further, the vertical arm is mounted to the horizontal frame via a sliding member such that an upper end of the arm part slides left and right. Then, the sliding member slides left and right along the horizontal frame along with the pivot of the vertical arm, whereby the screen is extended upward and downward.

PRIOR ART DOCUMENT

Patent Document

Patent Document 1: Japanese Patent Application Laid-Open No. 11-62442 (1999)

SUMMARY OF THE INVENTION

Problem to be Solved by the Invention

Unfortunately, in Patent Document 1, the vertical frame arm is configured such that the mounting part is directed toward the window frame in the state in which the screen is extended, and thus the arm part is disposed so as to overlap the screen on the side closer to the center in the width direction of the screen with respect to the revolving part, that is, at the location spaced from the vertical frame of the window. This makes the vertical frame arms conspicuous in the state in which the screen is extended.

Therefore, an object of the present invention is to make arms inconspicuous in a state in which a screen is drawn.

Means to Solve the Problem

A sunshade device according to a first aspect is capable of shading a window, which includes: a windup device; a screen mounted to the windup device so as to be drawn therefrom and housed therein; a stay mounted to a drawing-side edge of the screen; and a pair of arms each including a distal end portion connected to the stay so as to rotate relative thereto and a proximal end portion supported by the windup device so as to rotate relative thereto about a rotation axis, the pair of arms being configured to change a position between a folded position for causing the screen to be housed and an extended position for causing the screen to be drawn through a rotary movement about the rotation axis, wherein: the pair of arms each include, in the extended position, an extending-toward-frame portion extending toward a vertical frame of the window from the rotation axis and an extending-along-frame portion extending along the vertical frame of the window in a manner of being bent from a distal end portion of the extending-toward-frame portion; and the extending-along-frame portion includes a distal-end-side portion and a proximal-end-side portion integrally formed with the extending-toward-frame portion, the distal-end-side portion and the proximal-end-side portion being connected so as to rotate relative thereto.

A sunshade device according to a second aspect is capable of shading a window, which includes: a windup device; a screen mounted to the windup device so as to be drawn therefrom and housed therein; a stay mounted to a drawing-side edge of the screen; and a pair of arms each including a distal end portion connected to the stay so as to move along a longitudinal direction thereof and a proximal end portion supported by the windup device so as to rotate relative thereto about a rotation axis, the pair of arms being configured to change a position between a folded position for causing the screen to be housed and an extended position for causing the screen to be drawn through a rotary movement about the rotation axis, wherein the pair of arms each include, in the extended position, an extending-toward-frame portion extending toward a vertical frame of the window from the rotation axis and an extending-along-frame portion extending along the vertical frame of the window in a manner of being bent from a distal end portion of the extending-toward-frame portion.

According to a third aspect, in the sunshade device according to the first or second aspect, the extending-along-frame portion is extendable and retractable along a longitudinal direction thereof and includes a biasing member biased in an extending direction.

Effects of the Invention

According to the sunshade device of the first aspect, a pair of arms are configured such that in the extended position, the extending-toward-frame portion extends toward the vertical frame of a window from the rotation axis and the extending-along-frame portion extends along the vertical frame of the window in a manner of being bent from the distal end portion of the extending-toward-frame portion. With this configuration, in the pair of arms in the extended position, the extending-along-frame portion is disposed on the edge side in the width direction of the screen along the vertical frame of the window, that is, disposed at the location in proximity to the vertical frame of the window, which makes the arms inconspicuous in the state in which the screen is drawn. Further, the distal-end-side portion and the proximal-end-side portion of the extending-along-frame portion are connected so as to rotate relative thereto, which makes the folded position of the pair of arms, that is, the state in which the screen is housed, compact.

According to the sunshade device of the second aspect, in the pair of arms in the extended position, the extending-along-frame portion is disposed on the edge side in the width direction of the screen along the vertical frame of the window, which makes the arms inconspicuous in the state in which the screen is drawn.

Further, when the position of the pair of arms is changed from the folded position to the extended position, the stay is moved forward in the drawing direction from the location of the extended position in the state before the position is changed to the extended position, due to the shape of the bent arms and, after that, is moved backward in the drawing direction up to the location of the extended position. According to the sunshade device of the third aspect, a distance amount of the excessive movement can be absorbed by an extending/retracting movement of the extending-along-frame portion. This enables to eliminate the space of moving for the distance amount of excessive movement in the vertical direction of the window, and accordingly the window can be covered over the entire width direction.

EMBODIMENTS FOR CARRYING OUT THE INVENTION

A sunshade device according to an embodiment is described. The sunshade device serves to shade a window against light using a screen. The screen is mounted to a windup device so as to be drawn therefrom and housed therein, and a drawing-side edge thereof is mounted to a stay. The sunshade device is configured such that, through a change of the position of a pair of arms connected to the stay and the windup device, the stay is operated to move in the drawing/housing direction of the screen and the screen is drawn from and housed in the windup device.

<1. Configuration of Sunshade Device>

Figure 1:
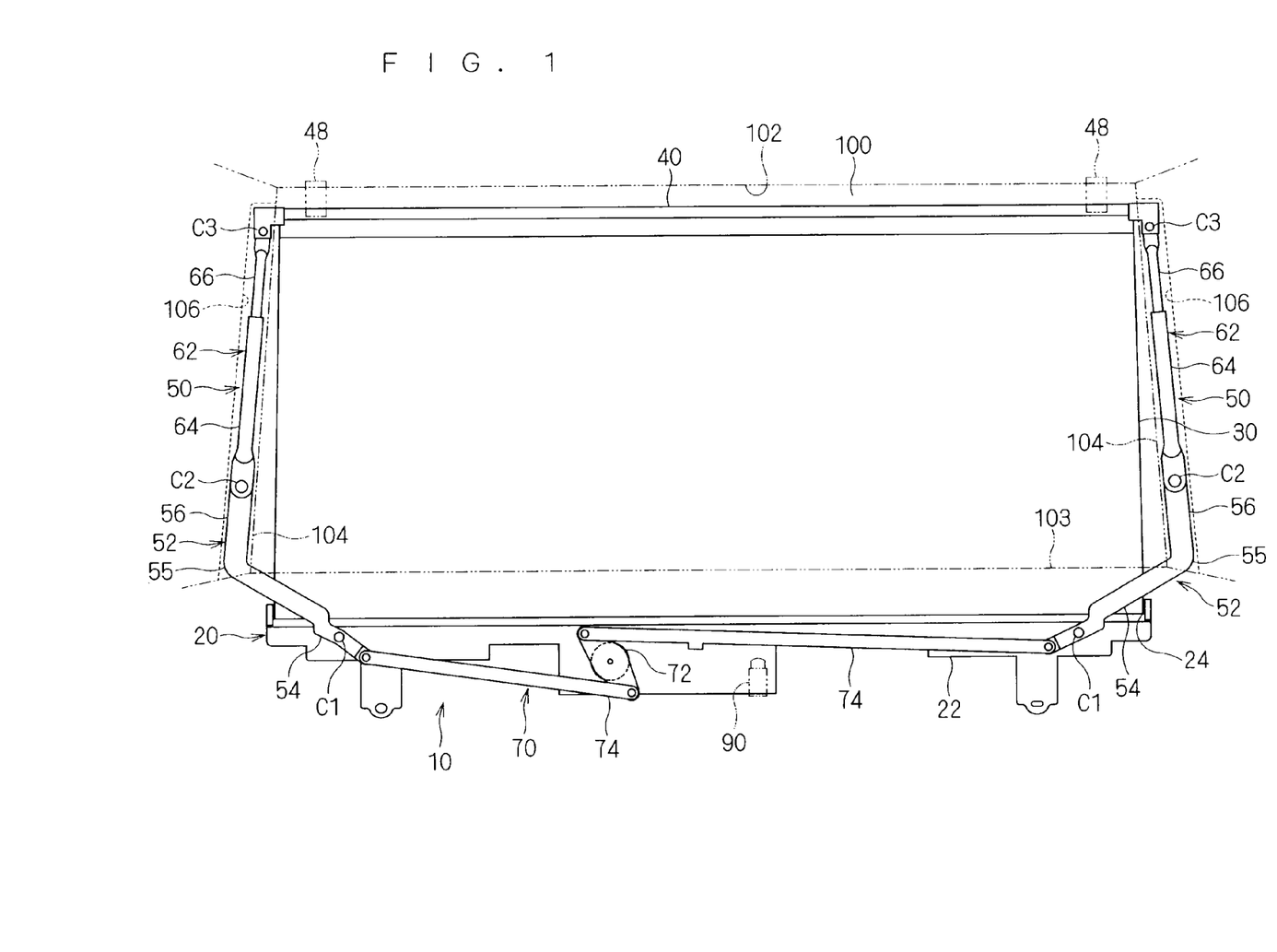
FIG. 1 is a plan view showing a sunshade device in a state in which a screen is drawn.
Figure 2:
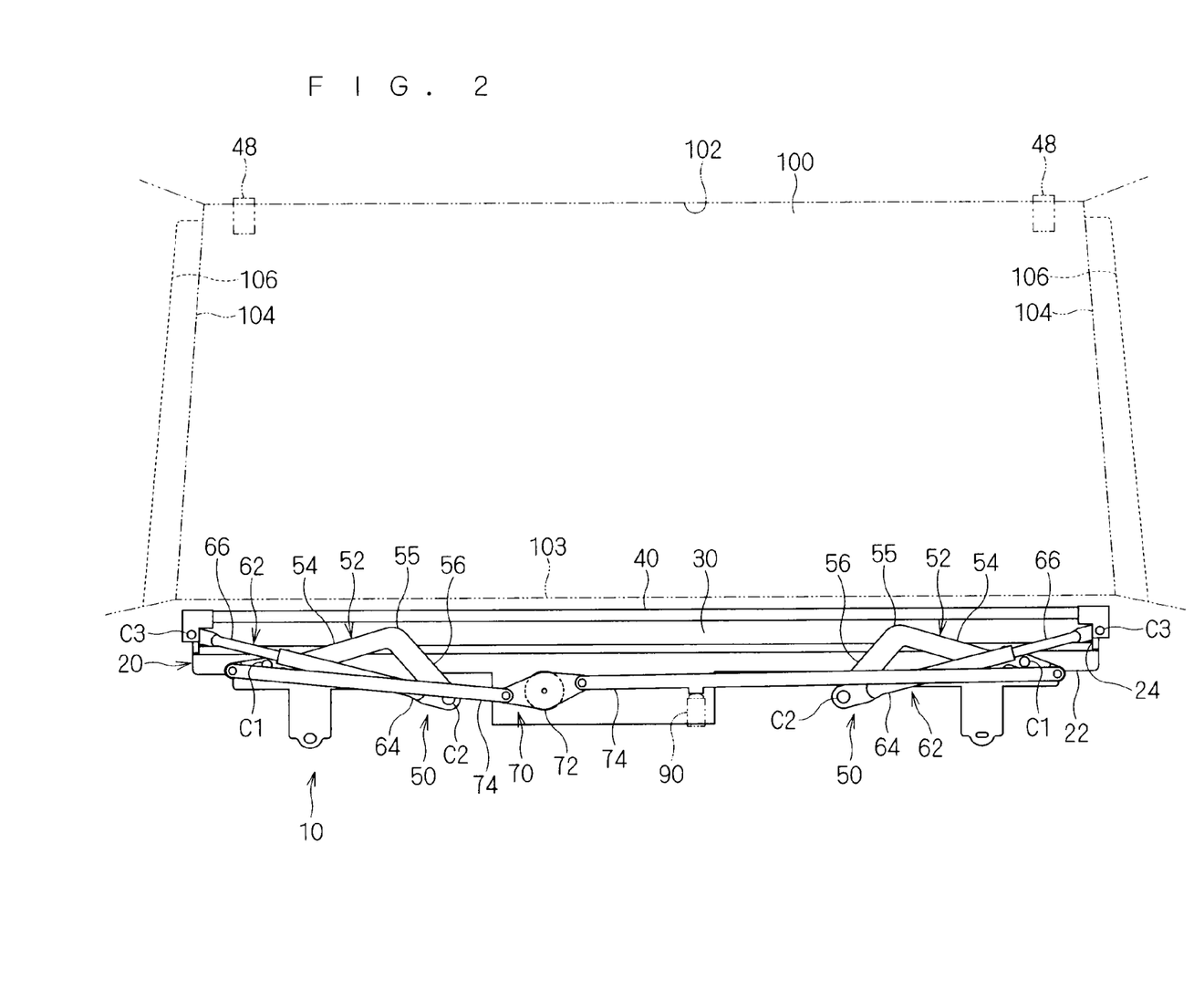
FIG. 2 is a plan view showing the sunshade device in a state in which the screen is housed.

The configuration of the sunshade device is described below in detail. FIG. 1 is a plan view showing a sunshade device 10 in a state in which a screen 30 is drawn, and FIG. 2 is a plan view showing the sunshade device 10 in a state in which the screen 30 is housed.

For the sake of description, a window 100 that is a target of the sunshade device 10 is described. Description is now given assuming that the window 100 is a rear window of a vehicle, which is formed into an approximately trapezoidal shape. Four sides of the window 100 are surrounded by a window frame including a ceiling-side horizontal frame 102 and a floor-side horizontal frame 103 that extend in the width direction of a vehicle, and a pair of vertical frames 104 adjacent to the ceiling-side horizontal frame 102 and the floor-side horizontal frame 103. In this case, the ceiling-side horizontal frame 102, floor-side horizontal frame 103 and vertical frames 104 refer to portions disposed in the peripheries of the window 100 as well as portions including a resin panel and the like (such as roof, rear tray and trim) of a vehicle interior around those portions. Formed in the vertical frames 104 are housing groove parts 106 that are open toward the center in the width direction of the vehicle and are capable of partially housing a pair of arms 50 described below in a position in which those are extended.

The sunshade device 10 includes a windup device 20, the screen 30, a stay 40 and a pair of arms 50.

The windup device 20 includes a base 22 and a windup shaft 24, which is configured such that the windup shaft 24 is supported by the base 22 so as to rotate relative thereto about a rotation axis and is rotatively biased against the base 22 by a biasing member (not shown) (coil spring) on one side in the rotation direction. The base 22 is formed so as to be mounted to the vehicle by, for example, screwing.

The screen 30 is a sheet-like member formed by, for example, cutting and sewing the material such as cloth in accordance with the shape, size and the like of the window 100 of a target vehicle. The screen 30 may be formed with a fabric material capable of blocking the light entering through a vehicle window. In this case, the screen 30 is formed in an approximately trapezoidal shape. Needless to say, the shape of the screen 30 is not limited thereto and, for example, may be rectangular.

The screen 30 is mounted to the windup device 20 so as to be drawn therefrom and housed therein in the direction approximately perpendicular to the longitudinal direction thereof. More specifically, one edge of the screen 30 is mounted to the windup shaft 24 so as to keep the state in which it is drawn in the housing direction (state in which it is wound up and biased) in the range between the housed state and the drawn state. That is, the screen 30 keeps the state of being housed in the windup device 20 in the state in which an external force is not exerted. In this case, the screen 30 is mounted to the windup device 20 such that the drawing-side edge (edge opposed to the one edge mounted to the windup shaft 24) thereof is approximately parallel to the longitudinal direction of the windup device 20.

The stay 40 is mounted to the drawing-side edge of the screen 30. The stay 40 is formed in an elongated rod shape, and both end portions thereof are formed so that a pair of arms 50 described below can be respectively connected thereto. The screen 30 is drawn or housed by moving the stay 40 to be close to or apart from the windup device 20 in the drawing/housing direction of the screen 30.

In this case, the windup device 20 is disposed in the floor-side horizontal frame 103 of the window 100 in a position such that the screen 30 can be drawn from the floor-side horizontal frame 103 toward the ceiling-side horizontal frame 102 along the window 100. That is, the floor-side horizontal frame 103 is configured so as to house therein the entirety of the sunshade device 10 in the state in which the screen 30 is housed and is also configured so as to draw therefrom and house therein the screen 30 through an opening directed toward the ceiling-side horizontal frame 102.

The sunshade device 10 is configured such that the screen 30 is drawn or housed upon the stay 40 moving close to or apart from the windup device 20 in accordance with the movement of the pair of arms 50 that are mounted between the stay 40 and the windup device 20.

Distal end portions of the pair of arms 50 are connected to the stay 40 so as to rotate relative thereto or to move along the longitudinal direction thereof (in this case, to rotate relative thereto), and proximal end portions of the pair of arms 50 are supported by the windup device 20 so as to rotate relative thereto around the rotation axis. The pair of arms 50 are configured so as to change the position between the folded position in which the screen 30 is housed and the extended position in which the screen 30 is drawn through the rotary movement about the rotation axis. Each of the pair of arms 50 includes a pivot base 52 and an arm part 62.

The pivot base 52 is formed in an approximately L-shape having a bent part 55 (in this case, a bent shape at an obtuse angle), and a part of one-end-side portion 54 located on the side closer to the proximal end with respect to the bent part 55 is connected to the base 22 (in this case, spot on the end side in the longitudinal direction) of the windup device 20 by a pin or the like so as to rotate relative thereto about the rotation axis that is approximately perpendicular to the screen 30 in the drawn state, and is supported thereby. Description is given below by referring to the connected portion as a first connecting part C1. In this case, the pivot base 52 is supported by the base 22 to move on an imaginary plane with spacing from the screen 30 in the direction approximately perpendicular to the screen 30 in a drawn state so as not to interfere with the screen 30 that is drawn from the windup device 20. Further, a distal end portion of the other-end-side portion 56 positioned on the side closer to the distal end with respect to the bent part 55 of the pivot base 52 is formed so as to be connected to a proximal end portion of the arm part 62.

More specifically, the pivot base 52 is supported by the windup device 20 in a position such that the one-end-side portion 54 on the side closer to the proximal end with respect to the bent part 55 extends toward the vertical frame 104 of the window 100 from the first connecting part C1 and the other-end-side portion 56 on the side closer to the distal end with respect to the bent part 55 extends toward the vertical frame 104 in the state in which the arms 50 are extended. In addition, the pivot base 52 is configured such that the bent part 55 and the other-end-side portion 56 are housed in the housing groove part 106 of the vertical frame 104 in the state in which the arms 50 are extended.

The arm part 62 is formed in an elongated rod shape, and a distal end portion thereof is connected to the end portion in the longitudinal direction of the stay 40 so as to rotate relative thereto and a proximal end portion thereof is connected to a distal end portion of the pivot base 52 so as to rotate relative thereto. More specifically, the arm part 62 is connected to the stay 40 and the pivot base 52 by a pin or the like so as to rotate relative thereto about the axis approximately perpendicular to the screen 30 in the drawn state. Hereinafter, the connecting part between the arm part 62 and the pivot base 52 is referred to as a second connecting part C2 and the connecting part between the arm part 62 and the stay 40 is referred to as a third connecting part C3.

Further, the arm part 62 is configured so as to extend and retract in the longitudinal direction thereof. More specifically, the arm part 62 includes an extending/retracting base 64 and an extending/retracting part 66 disposed to the extending/retracting base 64 so as to extend and retract between the extending location and the retracting location along the longitudinal direction thereof. In this case, the portion on the distal end side of the extending/retracting base 64 is formed in a hollow shape into which a portion on the proximal end side of the extending/retracting part 66 can be inserted along the longitudinal direction thereof. The portion on the proximal end side of the extending/retracting part 66 is disposed in the extending/retracting base 64 and the portion on the distal end side thereof is disposed so as to be exposed.

The arm part 62 includes, along the longitudinal direction thereof, a biasing member 68 that causes the extending/retracting part 66 to be biased against the extending/retracting base 64 in the extending direction. More specifically, the biasing member 68 is a coil spring and is disposed within the extending/retracting base 64 in a compressed state. The arm part 62 is configured to keep the state in which the extending/retracting part 66 extends from the extending/retracting base 64 by the biasing force of the biasing member 68, that is, the extending state, in the state in which a force is not exerted in the longitudinal direction thereof. Needless to say, the biasing member 68 is not limited to a coil spring, and a leaf spring or the like may be employed.

In the state in which the arms 50 are extended, the arm part 62 is configured so as to be disposed almost linearly with respect to the other-end-side portion 56 of the pivot base 52 and extend along the vertical frame 104. In this case, the arm part 62 is configured so as to be housed in the housing groove part 106 of the vertical frame 104 together with the end portion of the stay 40 and the other-end-side portion 56 of the pivot base 52 in the state in which the arms 50 are extended.

That is, the pair of arms 50 are configured such that in the extended state, the one-end-side portion 54 of the pivot base 52 extends toward the vertical frame 104 of the window 100 from the rotation axis of the first connecting part C1 and the other-end-side portion 56 of the pivot base 52 and the arm part 62 extend along the vertical frame 104 of the window 100 in such a manner of being bent from the distal end portion of the one-end-side portion 54 of the pivot base 52.

The pair of arms 50 may be provided with stoppers for preventing the position thereof from changing in the extending direction beyond the extended position. For example, the stopper may employ the configuration such that the pair of arms 50 abut against the lateral end of the pivot base 52 or the arm part 62 at the location at which the position thereof is changed to the extended position to regulate the position change of the pair of arms 50 in the direction in which the pair of arms 50 are extended.

In the pair of arms 50 in the folded state, the pivot base 52 and the arm part 62 are bent at the location of the second connecting part C2 such that the second connecting part C2 is directed toward the center in the longitudinal direction of the windup device 20 and the stay 40 (width direction of the vehicle and window 100). In this case, the pair of arms 50, the stay 40 and the screen 30 are disposed in the floor-side horizontal frame 103 together with the windup device 20 in the state in which the pair of arms 50 are folded. Further, in the pair of arms 50 in the extended state, the other-end-side portion 56 of the pivot base 52 and the arm part 62 are housed in the housing groove part 106 along the vertical frame 104 in an approximately linear position.

Figure 3:
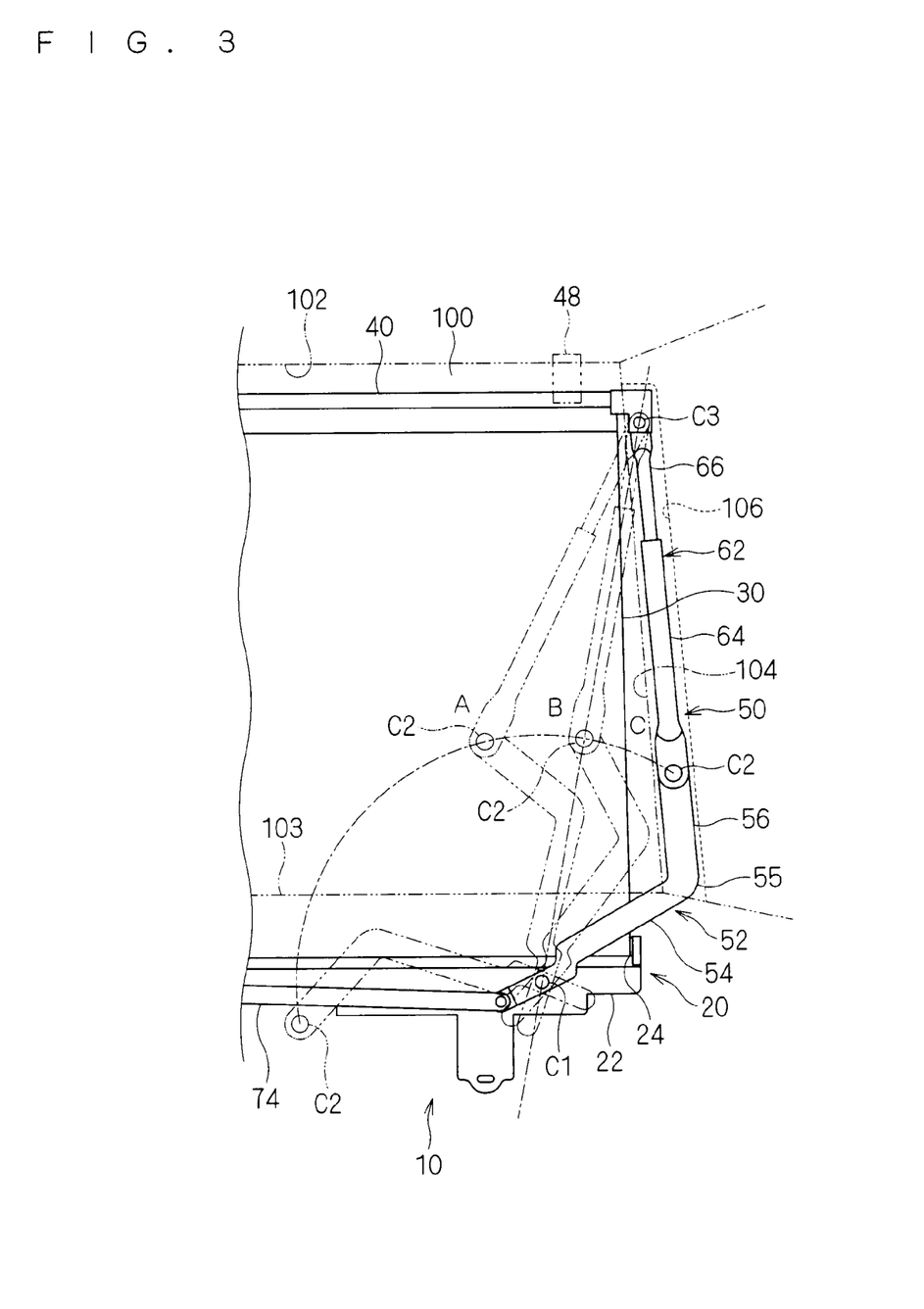
FIG. 3 is a view showing an action of changing a position of an arm.

The pair of arms 50 enter the state in which the stay 40 is disposed at the location at which the screen 30 is drawn beyond the location of the stay 40 in the extended position while the position thereof is changed from the folded position to the extended position upon bending of the pivot base 52. More specifically, the pair of arms 50 enter the state in which the screen 30 is drawn most in the position in which the second connecting part C2 is disposed on a straight line that connects the first connecting part C1 and the third connecting part C3 (position B of FIG. 3), and the stay 40 is moved in the housing direction when the position is changed from this position to the extended position (position C of FIG. 3).

In order to prevent the stay 40 from moving excessively as described above, regulating members 48 capable of regulating the movement of the stay 40 in the direction in which the screen 30 is drawn/housed may be disposed in the ceiling-side horizontal frame 102 or the housing groove part 106 of the vertical frame 104 (in this case, ceiling-side horizontal frame 102). It suffices that the regulating member 48 is disposed, in such a manner of regulating movement, so as to abut against the drawing-side end portion of the stay 40 at least in the state in which the pair of arms 50 are extended and to prevent the stay 40 from moving in the drawing direction of the screen 30 from the abutting location.

Then, the stay 40 abuts against the regulating members 48 at the location in the course of position change from the folded position to the extended position, and the position is changed further, whereby the arm parts 62 are retracted. Accordingly, the stay 40 is kept at the location at which it abuts against the regulating members 48 while the position of the pair of arms 50 is changed to the extended position. This prevents the stay 40 from coming into contact with, for example, the ceiling-side horizontal frame 102 due to an excessive movement thereof, which prevents the ceiling-side horizontal frame 102 from being damaged.

Further, the arm part 62 is configured so as to keep the state in which the stay 40 is biased against the regulating members 48 so as to be pressed thereagainst by the biasing force of the biasing member 68 also in the state in which the pair of arms 50 are extended. This suppresses the screen 30, the stay 40 and the pair of arms 50 from rattling in the position in which the pair of arms 50 are extended.

Alternatively, the regulating member 48 may be mounted to the stay 40 itself, which is only required to be configured so as to abut against the ceiling-side horizontal frame 102 or a wall part of the housing groove part 106 of the vertical frame 104 at the above-mentioned location.

Further, the sunshade device 10 is configured such that the pair of arms 50 are driven by a drive mechanism part 70 and accordingly the screen 30 is drawn and housed automatically.

The drive mechanism part 70 is configured so as to rotatively drive the pivot base 52 about the rotation axis of the first connecting part C 1. In this case, the drive mechanism part 70 includes a motor 72 and given links 74 connected to the motor 72 and the portions of the pivot bases 52 on the side closer to the proximal end with respect to the first connecting part C1, and is configured so as to rotatively drive the pivot bases 52 via the given links 74 by the motor 72. It suffices that the drive mechanism part 70 is connected to an operation part (not shown) capable of operating driving of the motor 72 so as to operate drawing/housing of the screen 30 via the operation part.

Further, the drive mechanism part 70 may be configured such that rotary driving of the motor 72 is stopped when the position of the pair of arms 50 is changed between the folded position and the extended position. Examples of the configuration that can be employed as the above-mentioned configuration include the configuration in which microswitches 90 (FIGS. 1 and 2 show only the microswitch 90 that can be pressed in the folded position) are disposed at the locations pressed by the pair of arms 50, the stay 40 or the links 74 and the motor 72 is stopped through a pressing operation thereof when the position of the pair of arms 50 is changed between the folded position and the extended position, and the configuration in which, for example, a rotary encoder is disposed and the motor 72 rotates for a predetermined amount of rotation and then stops.

Needless to say, the sunshade device 10 is not limited to the above-mentioned form. Hereinafter, a sunshade device 10a according to another embodiment is described (see FIG. 7 and FIG. 8). Note that similar components to those of the sunshade device 10 are denoted by the same reference symbols, and description thereof is omitted. The sunshade device 10a includes a pair of arms 50a having a shape in which the pivot base 52 and the arm part 62 of the sunshade device 10 according to the embodiment described above are integrally formed in the extended position. That is, the arm 50a has a shape in which a pivot base 52a and an arm part 62a are continuous.

Figure 7:
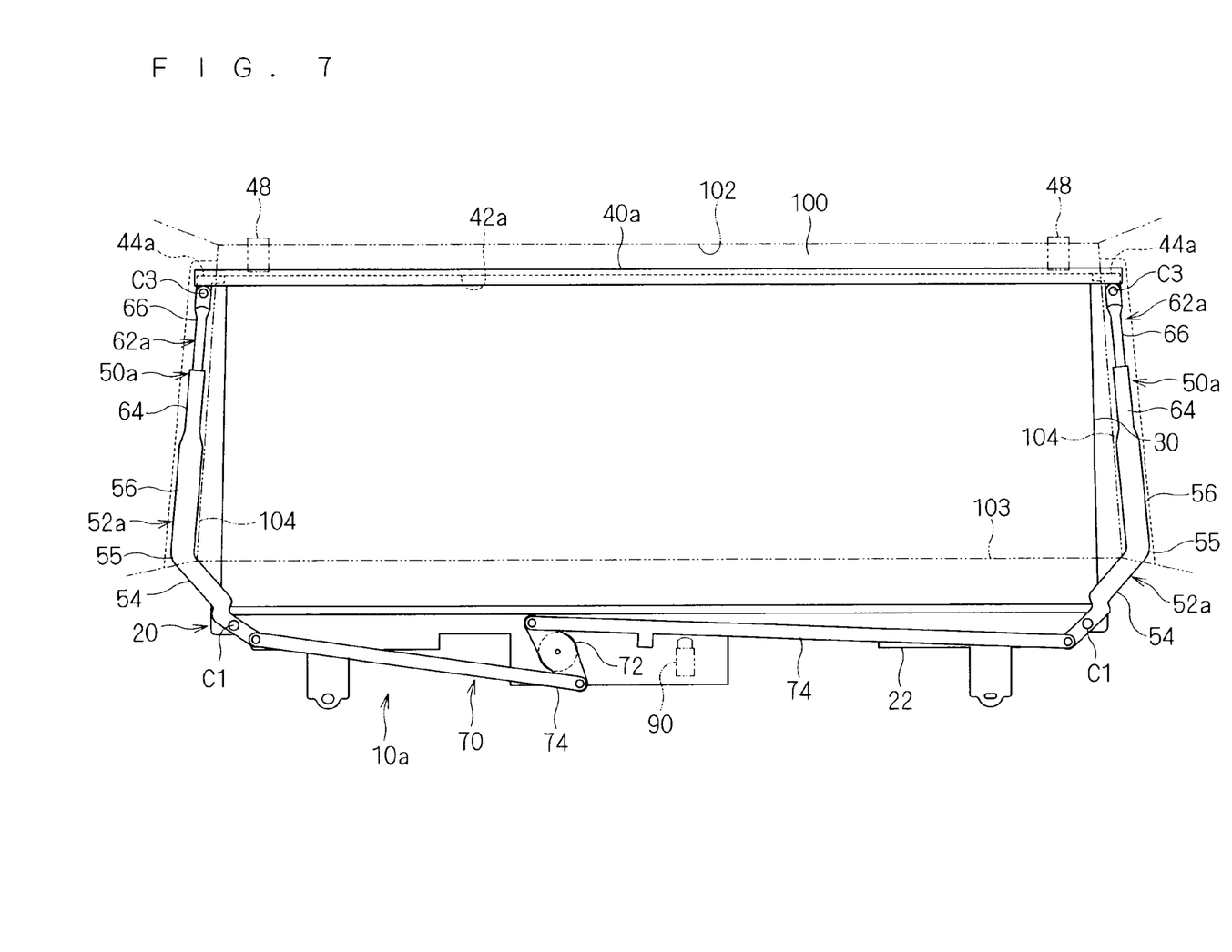
FIG. 7 is a plan view showing a state in which a screen of a sunshade device according to another embodiment is drawn.
Figure 8:
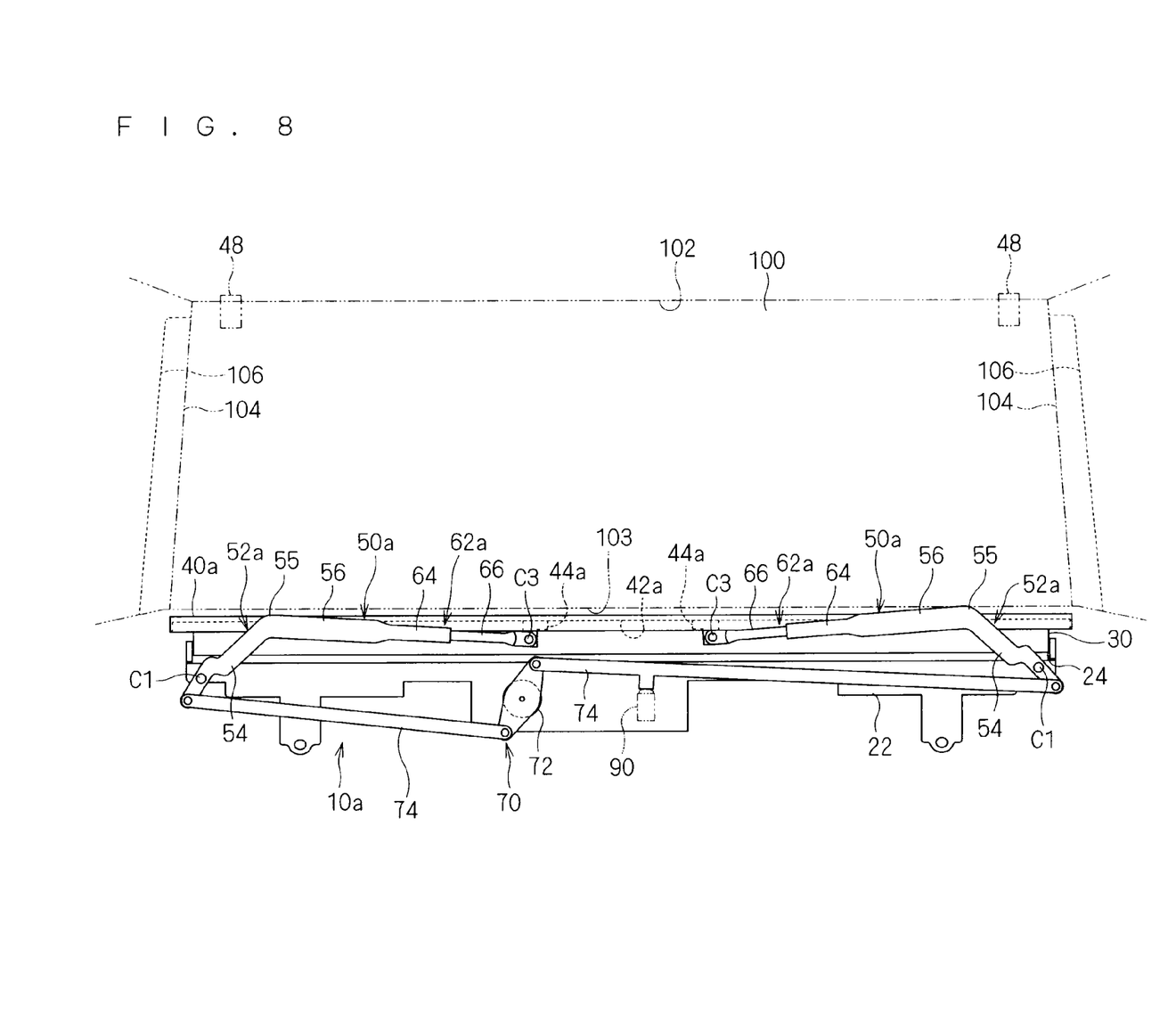
FIG. 8 is a plan view showing a state in which the screen of the sunshade device according to the another embodiment is housed.

The arm 50a basically has a similar configuration to those of the pivot base 52 and the arm part 62 of the sunshade device 10 except for that the pivot base 52a and the arm part 62a are continuous without involving a connecting part capable of rotating relative thereto, and the parts thereof are denoted by the same reference symbols. The arm 50a is formed in an approximately L-shape in its entirety without involving a connecting part capable of rotating relative thereto, and has a proximal end portion connected to the windup device 20 so as to rotate relative thereto (first connecting part C1) and a distal end portion connected to a stay 40a so as to move. More specifically, a groove 42a is formed along the longitudinal direction of the stay 40a, and a sliding member 44a slidable in the groove 42a along the longitudinal direction of the stay 40a is mounted to the distal end portion of the arm 50a (third connecting part C3). In the state in which a pair of arms 50a are folded, the distal end portions thereof are disposed at locations in proximity to the center in the longitudinal direction of the stay 40a, whereby the screen 30 is housed. Meanwhile, when the position of the pair of arms 50a is changed from the folded position to the extended position, the stay 40a is moved toward the drawing direction of the screen 30 upon the distal end portions thereof moving from the center in the longitudinal direction of the stay 40a toward both ends thereof, with the result the screen 30 is drawn. In the state in which the pair of arms 50a are extended, the distal end portions thereof are disposed at the locations of both ends of the stay 40a, with the result that the screen 30 is drawn.

Further, the sunshade device 10 is not limited to one having a configuration in which the arm parts 62 are extendable and retractable. For example, the configuration in which the arm parts 62 are extendable and retractable may be provided to the other-end-side portions 56 of the pivot bases 52 such that the other-end-side portions 56 are configured to be extendable and retractable.

Further, the sunshade device 10 is applicable to, for example, a sunroof, a side door window and the like in addition to a rear window of a vehicle and windows other than ones of a vehicle.

<2. Action of Sunshade Device>

Next, the action of the sunshade device 10 according to the present embodiment is described.

Description is given assuming that as an initial state of the sunshade device 10, the screen 30 is maintained by the windup device 20 to be housed therein in the state in which a pair of arms 50 are folded. In this state, the arm part 62 is maintained in the state of being biased by the biasing member 68 at the location at which the extending/retracting part 66 extends from the extending/retracting base 64. It suffices that the arm part 62 can retract from the state in which the stay 40 abuts against the regulating member 48, and the extending/retracting part 66 may be pushed to the extending/retracting base 64 at the retracting location and retracted in the state in which the pair of arms 50 are folded.

First, an operator (such as a driver or occupant of a vehicle) operates an operation part to draw the screen 30, and then a pair of arms 50 start changing a position from the folded position to the extended position. More specifically, upon the operation part being operated, the motor 72 is rotatively driven, whereby the pivot base 52 is rotatively driven about the rotation axis of the first connecting part C1 via the given link 74 (in this case, in such a manner that the other-end-side portion 56 of each pivot base 52 is opened toward the drawing side of the screen 30). The position of the arm part 62 is changed in accordance with the rotary movement of the pivot base 52, and the stay 40 connected to the arm part 62 moves toward the drawing direction of the screen 30. The distal end portions of the arm parts 62 are connected to both ends of the stay 40 and the movements thereof are regulated in the longitudinal direction of the stay 40, and the proximal end portions thereof are moved toward the vertical frame 104 by the pivot bases 52. As a result, the positions of the arm parts 62 are changed, whereby the stay 40 is moved in the drawing direction. Then, as the rotary movements of the pivot bases 52 advance, the position of the pair of arms 50 is changed such that the second connecting parts C2 gradually become close to the vertical frames 104 (second connecting parts C2 are spaced from each other) and the angle formed by the longitudinal direction of the arm part 62 and the edge of the vertical frame 104 approaches 0 degrees.

Figure 4:
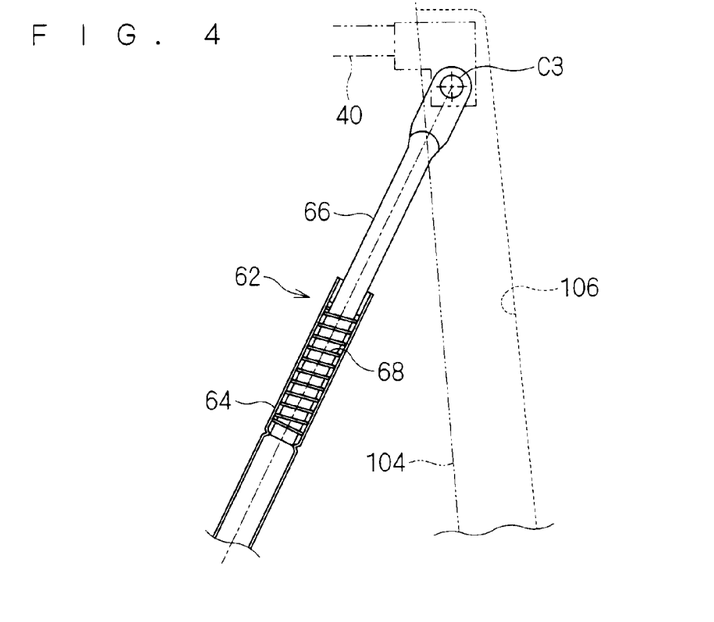
FIG. 4 is a view showing an arm part in a position A of FIG. 3.

Upon extending of the pair of arms 50 to a location at which the stay 40 abuts against the regulating members 48 (position A of FIG. 3), the movement of the stay 40 in the direction in which the screen 30 is drawn is regulated, and the arm parts 62 are gradually retracted in accordance with the extending movement of the pair of arms 50 (see FIG. 4). More specifically, a compression force is gradually applied in the longitudinal direction of the arm part 62 along with a position change from the position in which the stay 40 abuts against the regulating members 48, and the extending/retracting part 66 is pushed into the extending/retracting base 64, whereby the biasing member 68 is compressed. At the location at which the stay 40 abuts against the regulating members 48, both end portions of the stay 40 and both distal end portions (third connecting parts C3) of the arm parts 62 are disposed in the housing groove parts 106 of the vertical frames 104.

Figure 5:
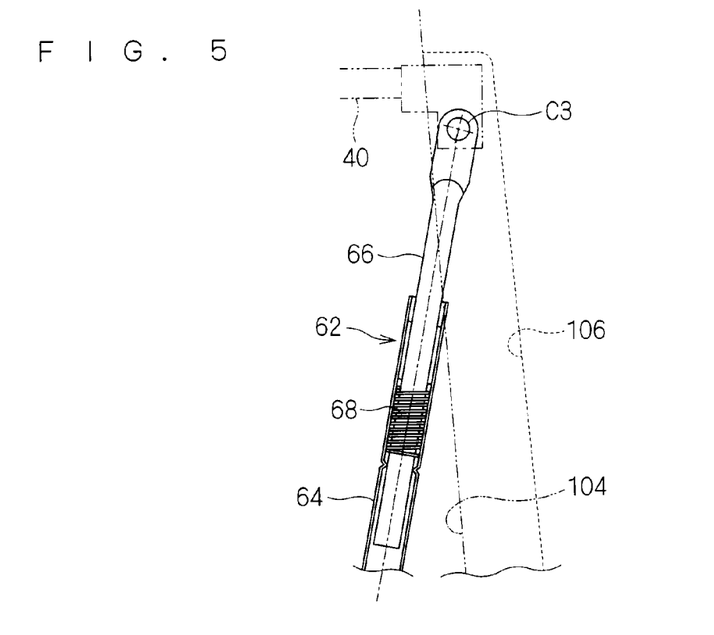
FIG. 5 is a view showing the arm part in a position B of FIG. 3.
Figure 6:
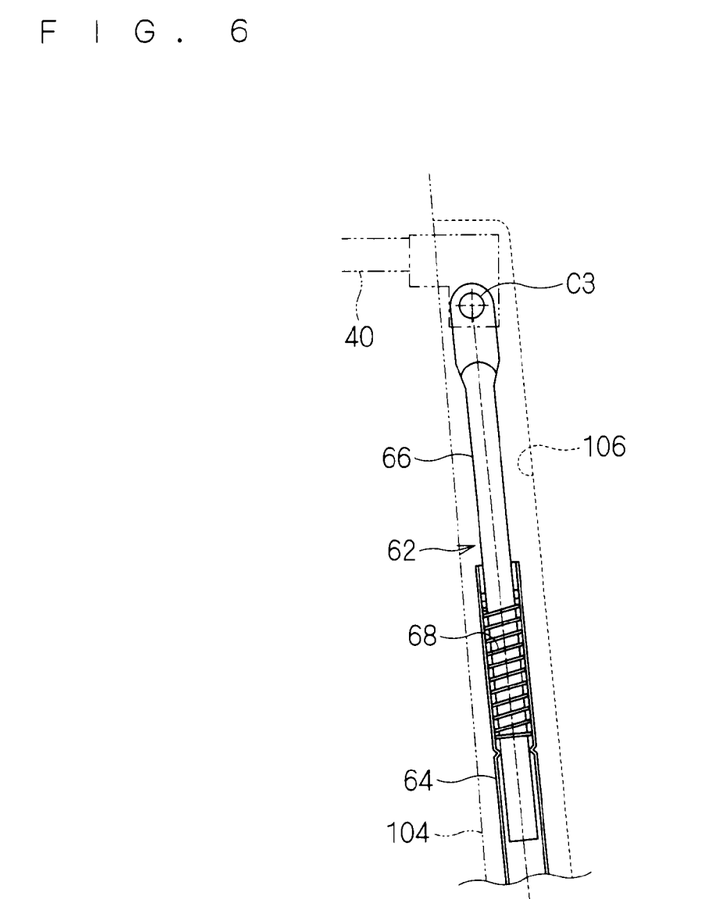
FIG. 6 is a view showing the arm part in a position C of FIG. 3.

Then, in the pair of arms 50, the extending/retracting part 66 of the arm part 62 is pushed into the extending/retracting base 64 most (state in which the extending/retracting part 66 has moved to the retracting location) in the position in which the second connecting part C2 is disposed on a straight line that connects the first connecting part C1 and the third connecting part C3 (position B of FIG. 3) (see FIG. 5). Further, the pivot base 52 is rotatively driven, whereby the distance between the second connecting part C2 and the third connecting part C3 gradually increases in the state in which the stay 40 is pressed against the regulating member 48 by the biasing force of the biasing member 68. Accordingly, the arm part 62 changes to extend until the position of the pair of arms 50 is changed to the extended position (position C of FIG. 3) (see FIG. 6). Further, along with the position change of the pair of arms 50, the other-end-side portion 56 of the pivot base 52 and the arm part 62 are gradually housed in the housing groove part 106 of the vertical frame 104.

Then, upon the position of the pair of arms 50 being changed to the extended position, the motor 72 stops, and the screen 30 is drawn, whereby the action of drawing the screen 30 is finished. In the state in which the screen 30 is drawn, the arm part 62 and the other-end-side portion 56 of the pivot base 52 are housed in the housing groove parts 106 of the vertical frames 104 in an approximately linear position and are disposed at locations so as not to overlap the screen 30. In this state, the one-end-side portion 54 of the pivot base 52 except for a part thereof is disposed in the floor-side horizontal frame 103 and the housing groove part 106 of the vertical frame 104. Further, in the state in which the pair of arms 50 are extended, the arm part 62 is kept in the state in which the stay 40 is biased against the regulating member 48 by the biasing force of the biasing member 68 so as to be pressed thereagainst. Then, the screen 30 enters the state in which the window 100 is partially or entirely shaded, in the position of being approximately parallel to the window 100.

The operator operates the operation part to house the screen 30, and then the pair of arms 50 start changing a position from the extended position to the folded position. More specifically, upon the operation part being operated, the motor 72 is rotatively driven, and the pivot bases 52 are rotatively driven such that the other-end-side portions 56 are folded toward the center in the longitudinal direction of the windup device 20. The stay 40 is moved in the direction in which the screen 30 is housed in accordance with the rotary movements of the pivot bases 52.

As the rotary movements of the pivot bases 52 advance, the pivot bases 52 and the arm parts 62 are bent at the second connecting parts C2, and the position of the pair of arms 50 is changed such that the second connecting parts C2 gradually become apart from the vertical frames 104 (such that the second connecting parts C2 become close to each other).

The extending/retracting part 66 of the arm part 62 is gradually pushed into the extending/retracting base 64 until the position of the second connecting part C2 is changed to the position of being disposed on a straight line that connects the first connecting part C1 and the third connecting part C3. After that, the extending/retracting part 66 gradually moves to the extending/retracting base 64 along with a position change, and the stay 40 becomes apart from the regulating members 48, with the result that the extending/retracting part 66 is kept at the location at which it is extended from the extending/retracting base 64 by the biasing force of the biasing member 68.

Then, upon position change of the pair of arms 50 to the folded position, the motor 72 is stopped, and the screen 30 is housed, whereby the action of housing the screen 30 is finished. In the state in which the screen 30 is housed, the screen 30, the stay 40 and the pair of arms 50 are disposed in the floor-side horizontal frame 103.

According to the sunshade device 10 configured as described above, the pair of arms 50 are configured such that, in the extended position, the one-end-side portion 54 of the pivot base 52 extends toward the vertical frame 104 of the window 100 from the rotation axis of the first connecting part C1 and the other-end portion 56 of the pivot base 52 and the arm part 62 extend along the vertical frame 104 of the window 100 in such a manner of being bent from the distal end portion of the one-end-side portion 54 of the pivot base 52. With this configuration, in the pair of arms 50 in the extended position, the other-end-side portion 56 of the pivot base 52 and the arm part 62 are disposed on the end side in the width direction of the screen 30 along the vertical frame 104 of the window 100, that is, at the locations in proximity to the vertical frame 104 of the window 100. As a result, the arms 50 can be made inconspicuous in the state in which the screen 30 is drawn. Further, in this case, the other-end-side portion 56 of the pivot base 52 and the arm part 62 are housed in the housing groove part 106 of the vertical frame 104, which makes the pair of arms 50 more inconspicuous.

In many cases, components on the body side of a vehicle, such as trunk hinges, are disposed at the lateral parts of the portion in which the windup device 20 is disposed, which makes it difficult to increase the width of the base 22 of the windup device 20 to dispose, at locations outside of the windup device 20 in the width direction of a vehicle, the connecting parts (first connecting parts C 1) with the pair of arms 50. Similarly to the sunshade device 10, however, a pair of arms 50 are formed in a bent shape, which makes the pair of arms 50 inconspicuous in the extended position without increasing the width of the base 22.

Further, owing to the bent shape of the arms 50, the stay 40 is moved in the drawing direction from the location of the extended position in the state before the position of the pair of arms 50 is changed to the extended position and, after that, is moved in the housing direction up to the location of the extended position. According to the sunshade device 10, it is possible to absorb the distance amount of excessive movement by the extending/retracting movement of the arm part 62. This saves the space of movement for the distance amount of excessive movement and also eliminates a return movement in the housing direction of the stay 40 in the vertical direction of the window 100. Accordingly, the window 100 can be covered over the entire longitudinal direction.

Further, the pair of arms 50 are configured such that the pivot base 52 and the arm part 62 are connected so as to rotate relative thereto, whereby compared with the mode in which the pivot base 52 and the arm part 62 are integrally formed, the folded position of the pair of arms 50, that is, the state in which the screen 30 is housed can be made more compact. As a result, the mode of transporting the sunshade device 10 can be made compact, which simplifies transportation as well as improves the transportation efficiency.

While the sunshade device 10 has been described above in detail, the foregoing description is in all aspects illustrative, and the present invention is not limited thereto. That is, numerous modifications and variations can be devised in the described aspects without departing from the scope of the invention.

DESCRIPTION OF REFERENCE SYMBOLS

10, 10*a* sunshade device
20 windup device
30 screen
40, 40*a* stay
50, 50*a* arm
68 biasing member
100 window
104 vertical frame

The invention claimed is:

1. A sunshade device configured to shade a window provided with housing groove parts on each side thereof in a width direction, the housing groove parts being open toward a center in the width direction, comprising:
    a windup device;
    a screen mounted to said windup device so as to be drawn therefrom and housed therein;
    a stay mounted to a drawing-side edge of said screen; and
    a pair of arms each including a distal end portion connected to said stay so as to rotate relative thereto and a proximal end portion supported by said windup device so as to rotate relative thereto about a rotation axis, said pair of arms being configured to change a position between a folded position for causing said screen to be housed, and an extended position for causing said screen to be drawn through a rotary movement about said rotation axis and in the extended position, said pair of arms being housed in said housing groove parts, wherein:
    said pair of arms each include, in said extended position, an extending-toward-frame portion extending toward a vertical frame of said window from said rotation axis and an extending-along-frame portion extending along the vertical frame of said window in a manner of being bent from a distal end portion of said extending-toward-frame portion,
    said extending-along-frame portion includes a distal-end-side portion and a proximal-end-side portion integrally formed with said extending-toward-frame portion, said distal-end-side portion and said proximal-end-side portion being connected so as to rotate relative thereto, and
    said extending-along-frame portion is extendable and retractable along a longitudinal direction thereof and includes a biasing member biased in an extending direction.

2. A sunshade device configured to shade a window provided with housing groove parts on each side thereof in a width direction, the housing groove parts being open toward a center in the width direction, comprising:
    a windup device;
    a screen mounted to said windup device so as to be drawn therefrom and housed therein;
    a stay mounted to a drawing-side edge of said screen; and
    a pair of arms each including a distal end portion connected to said stay so as to move along a longitudinal direction thereof and a proximal end portion supported by said windup device so as to rotate relative thereto about a rotation axis, said pair of arms being configured to change a position between a folded position for causing said screen to be housed, and an extended position for causing said screen to be drawn through a rotary movement about said rotation axis and in the extended position, said pair of arms being housed in said housing groove parts, wherein:
    said pair of arms each include, in said extended position, an extending-toward-frame portion extending toward a vertical frame of said window from said rotation axis and an extending-along-frame portion extending along the vertical frame of said window in a manner of being bent from a distal end portion of said extending-toward-frame portion, and
    said extending-along-frame portion is extendable and retractable along a longitudinal direction thereof and includes a biasing member biased in an extending direction.

* * * * *